US012770268B2

(12) United States Patent
Zhou

(10) Patent No.: US 12,770,268 B2
(45) Date of Patent: Oct. 20, 2026

(54) OBJECT MORPHOLOGY CORRECTION METHOD, APPARATUS AND DEVICE, STORAGE MEDIUM AND COMPUTER PROGRAM

(71) Applicant: TENCENT TECHNOLOGY (SHENZHEN) COMPANY LIMITED, Shenzhen (CN)

(72) Inventor: Zhiqiang Zhou, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 458 days.

(21) Appl. No.: 18/333,781

(22) Filed: Jun. 13, 2023

(65) Prior Publication Data

US 2023/0368395 A1 Nov. 16, 2023

Related U.S. Application Data

(63) Continuation of application No. PCT/CN2022/128637, filed on Oct. 31, 2022.

(30) Foreign Application Priority Data

Jan. 10, 2022 (CN) ......................... 202210024112.5

(51) Int. Cl.
*G06T 7/155* (2017.01)
*G06T 7/33* (2017.01)
(Continued)

(52) U.S. Cl.
CPC .............. *G06T 7/155* (2017.01); *G06T 7/344* (2017.01); *G06T 13/40* (2013.01); *G06T 19/20* (2013.01);
(Continued)

(58) Field of Classification Search
CPC ..................... G06T 7/155; G06T 19/20; G06T 2207/30201; G06T 2219/2021;
(Continued)

(56) References Cited

U.S. PATENT DOCUMENTS 6,307,576 B1 * 10/2001 Rosenfeld ............... G06T 13/40 704/E21.02
6,919,892 B1 * 7/2005 Cheiky ................... G06T 13/40 348/E5.022

(Continued)

FOREIGN PATENT DOCUMENTS

CN 103914806 A 7/2014
CN 111832468 A 10/2020

(Continued)

OTHER PUBLICATIONS

Ramadan, Rabab M., and Rehab F. Abdel-Kader. "3D Face compression and recognition using spherical wavelet parametrization." Int J Adv Comput Sci Appl 3.9 (2012). (Year: 2012).*

(Continued)

*Primary Examiner* — Sumati Lefkowitz
*Assistant Examiner* — Ryan P Potts
(74) *Attorney, Agent, or Firm* — Sughrue Mion, PLLC

(57) ABSTRACT

An image processing method is provided, the method includes: acquiring an image-to-be-processed, the image-to-be-processed including a target part of an object, the morphology of the target part being a first morphology, and the first morphology being not matched with an expected morphology; acquiring description information corresponding to the first morphology, and acquiring contour information of the target part in the first morphology; and correcting the morphology of the target part based on the description information and the contour information so as to correct the morphology of the target part from the first morphology to
(Continued)

a second morphology, the second morphology being matched with the expected morphology.

18 Claims, 6 Drawing Sheets

(51) Int. Cl.
*G06T 13/40* (2011.01)
*G06T 19/20* (2011.01)
*G06V 40/16* (2022.01)

(52) U.S. Cl.
CPC .. *G06V 40/171* (2022.01); *G06T 2207/20041* (2013.01); *G06T 2207/20081* (2013.01); *G06T 2207/30201* (2013.01); *G06T 2219/2021* (2013.01)

(58) Field of Classification Search
CPC ......... G06T 13/40; G06T 13/20; G06T 13/00; G06T 17/00; G06T 17/20; G06T 19/00; G06T 2207/10016; G06T 3/04; G06T 5/77; G06T 7/13; G06T 7/33; G06T 2207/20041; G06T 2207/20081; G06T 7/344; G06V 40/171; G06V 10/82; A63F 13/52; A63F 2300/66; A63F 2300/8082
See application file for complete search history.

(56) References Cited

U.S. PATENT DOCUMENTS

| | | | | |
|---|---|---|---|---|
| 9,747,716 | B1 | 8/2017 | Mallet et al. | |
| 10,970,907 | B1 * | 4/2021 | Albuz | G06V 40/172 |
| 2006/0001673 | A1 * | 1/2006 | Brand | G06T 13/40 345/473 |
| 2007/0127844 | A1 * | 6/2007 | Watanabe | G06V 40/171 382/276 |
| 2008/0170777 | A1 | 7/2008 | Sullivan et al. | |
| 2008/0317379 | A1 * | 12/2008 | Steinberg | G06T 11/60 382/275 |
| 2009/0310828 | A1 * | 12/2009 | Kakadiaris | G06V 40/168 382/118 |
| 2015/0009123 | A1 * | 1/2015 | Kim | G06T 19/00 345/156 |
| 2015/0379329 | A1 * | 12/2015 | Sasaki | G06V 40/171 348/77 |

FOREIGN PATENT DOCUMENTS

| | | | |
|---|---|---|---|
| CN | 112132764 | A | 12/2020 |
| CN | 114373033 | A | 4/2022 |

OTHER PUBLICATIONS

International Search Report for PCT/CN2022/128637 dated Dec. 28, 2022.
Written Opinion for PCT/CN2022/128637 dated Dec. 28, 2022.

* cited by examiner

OBJECT MORPHOLOGY CORRECTION METHOD, APPARATUS AND DEVICE, STORAGE MEDIUM AND COMPUTER PROGRAM

CROSS REFERENCE TO RELATED APPLICATIONS

This application is a continuation application of International Application No. PCT/CN2022/128637 filed on Oct. 31, 2022, which claims priority to Chinese Patent Application No. 2022100241125, filed with the China National Intellectual Property Administration on Jan. 10, 2022, the disclosures of which are incorporated by reference in their entireties.

FIELD

The disclosure relates to the technical field of computers, and particularly relates to an image processing technology.

BACKGROUND

In some virtual reality and game applications, a three-dimensional (3D) technology is generally adopted to create virtual characters such as player characters and monster characters in the applications to provide users with more realistic effects. Furthermore, in order to make the 3D characters more realistic, expressions such as smiling and sad expressions will be created for the 3D characters.

The expressions of the 3D characters may be created through a face controller, for example, when creating the expressions for the 3D characters, controller parameters of the face controller bound to the faces of the 3D characters can be edited and adjusted according to an image including the faces of the persons, and thus corresponding facial expressions can be created for the 3D characters.

However, because there are differences between the morphology of the faces of the 3D characters and the morphology of the faces of the persons in the image, and the morphology of different parts play a crucial role in the interpretation of the expressions, even small differences may have a significant impact on the emotional expression. Therefore, in many cases, the expressions created for the 3D characters through the above-mentioned method is greatly different from the expected facial expressions of the persons in the image. It is necessary to manually adjust to correct the morphology of the faces of the 3D characters. The manual correction method not only consumes manpower resources, but also has low correction efficiency.

SUMMARY

Some embodiments of the disclosure provide an image processing method, apparatus and device, a storage medium and a computer program, aiming to improve the correction efficiency of the morphology of a target part of an object.

Some embodiments of the disclosure provide an image processing method, implemented by a computer device, including:

acquiring an image-to-be-processed, the image-to-be-processed including a target part of an object, the morphology of the target part being a first morphology, and the first morphology being not matched with an expected morphology;

acquiring description information corresponding to the first morphology, and acquiring contour information of the target part in the first morphology; and correcting the morphology of the target part based on the description information and the contour information so as to correct the morphology of the target part from the first morphology to a second morphology, the second morphology being matched with the expected morphology.

Some embodiments of the disclosure further provide an image processing apparatus, including:

an acquisition unit, configured to acquire an image-to-be-processed, the image-to-be-processed including a target part of an object, the morphology of the target part being a first morphology, and the first morphology being not matched with an expected morphology;

the acquisition unit, further configured to acquire description information corresponding to the first morphology and acquire contour information of the target part in the first morphology; and a correction unit, configured to correct the morphology of the target part based on the description information and the contour information so as to correct the morphology of the target part from the first morphology to a second morphology, the second morphology being matched with the expected morphology.

Some embodiments of the disclosure provide a computer device, including: a processor suitable for implementing one or more computer programs, and a computer storage medium storing one or more computer programs, and the one or more computer programs being suitable for being loaded by the processor and implementing the image processing method provided by some embodiments of the disclosure.

Some embodiments of the disclosure provide a computer storage medium storing a computer program; and the computer program can be used for implementing the image processing method provided by some embodiments of the disclosure while being executed by the processor of the image processing device.

Some embodiments of the disclosure provide a computer program product or a computer program, the computer program product includes the computer program, and the computer program is stored in the computer storage medium; and the processor of the image processing device reads the computer program from the computer storage medium and executes the computer program, so that the image processing device implements the image processing method provided by some embodiments of the disclosure.

In some embodiments of the disclosure, the target part of the object in the image-to-be-processed is in the first morphology; if the first morphology is not matched with the expected morphology, the description information corresponding to the first morphology and the contour information of the target part in the first morphology can be acquired; further, the morphology correction is performed on the target part based on the description information corresponding to the first morphology and the contour information of the target part so as to correct the morphology of the target part from the first morphology to a second morphology, the second morphology is matched with the expected morphology. So that it is not needed to manually correct the first morphology, the morphology of the target part is automatically corrected according to the description information of the first morphology and the contour information of the target part in the first morphology, and as a result, the morphology of the target part conforms to the expected morphology. The manpower resource consumption caused by manual correction is saved, and the morphology correction efficiency is improved.

DETAILED DESCRIPTION

Figure 1A:
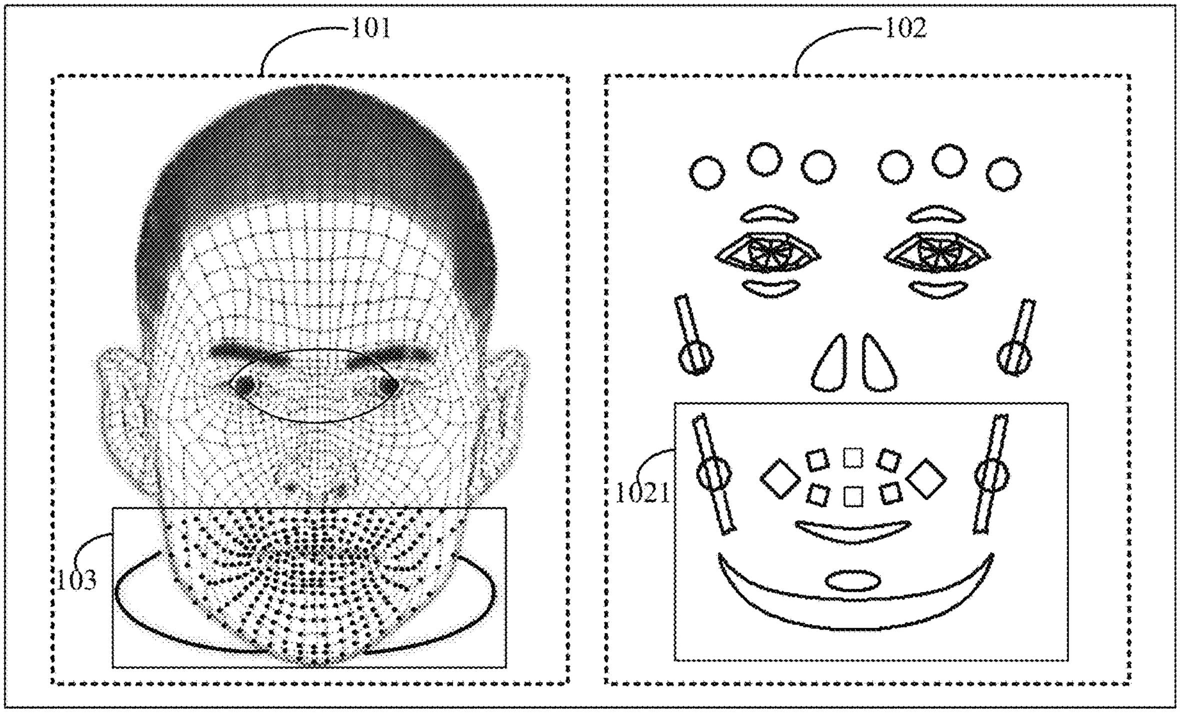
FIG. 1*a* is a schematic diagram of binding a 3D character image and a morphology controller according to some embodiments of the disclosure.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

Some embodiments of the disclosure provide an image processing method. The method includes: acquiring an image-to-be-processed, determining a target part of an object in the image-to-be-processed to be in a first morphology; further detecting whether the first morphology of the target part of the object in the image-to-be-processed is matched with an expected morphology or not; and when the first morphology of the target part is not matched with the expected morphology, performing morphology correction on the target part according to the contour information of the target part in the first morphology and the description information corresponding to the first morphology so as to correct the morphology of the target part from the first morphology to a second morphology matched with the expected morphology.

In some embodiments, the image processing method can be implemented by an image processing device, and the image processing device can be a terminal, such as a smart phone, a tablet computer, a notebook computer, a desktop computer, a smart loudspeaker box, a smart watch, a vehicle-mounted terminal, a smart home appliance, and a smart voice interaction device; or, the image processing device can also be a server, such as an independent physical server, a server cluster or a distributed system composed of a plurality of physical servers, and a cloud server for providing cloud computing services.

In another embodiment, the image processing method can be implemented by the image processing device and an image management device in a cooperative manner, for example, the image management device can store the image-to-be-processed and transmit the image-to-be-processed to the image processing device; the image processing device implements the image processing method after acquiring the image-to-be-processed; for another example, the image processing device can acquire the image-to-be-processed from the local storage, then acquire the description information corresponding to the first morphology of the target part in the image-to-be-processed and the contour information of the target part in the first morphology, and then transmit the description information and the contour information to the image management device; and the image management device corrects the morphology of the target part based on the description information and the contour information, and finally feed back a correction result to the image processing device.

The image processing device and the image management device are computer devices.

In some embodiments, the target part of the object in the image-to-be-processed can be any one or more of five sense organ parts included in the face of the object, such as eyes, lips, nose, ears, and eyebrows; or, the target part of the object in the image-to-be-processed can also be other parts of the object body, such as fingers, and arms. In order to facilitate description, unless otherwise specified, the lips are taken as an example for illustrating the target part in some embodiments of the disclosure.

According to some embodiments of the disclosure, the image processing method can be applied to a 3D character expression creating scene, for example, the image-to-be-processed refers to a 3D character image, the expressions are created for 3D characters in the 3D character image through the following operations (1) and (2), and the morphology of the target part in the created expressions is the first morphology. Specifically:

(1) The 3D character image is bound to a morphology controller. FIG. 1*a* is a schematic diagram of binding the 3D character image and the morphology controller according to some embodiments of the disclosure; 101 represents the 3D character image, the 3D character image is associated with an image grid; and each part of the face of the object in the 3D character image can be described through vertexes of a corresponding grid, for example, the lips can be described through the grid vertexes in 103. 102 represents a part control corresponding to the 3D character image in the morphology controller, for example, 1021 represents a part control bound to the lips of the 3D characters in the morphology controller. Controller parameters in the morphology controller can include parameters of each part control, and the parameters of each part control can determine the size information, shape information and the like of the bound part.

Figure 1B:
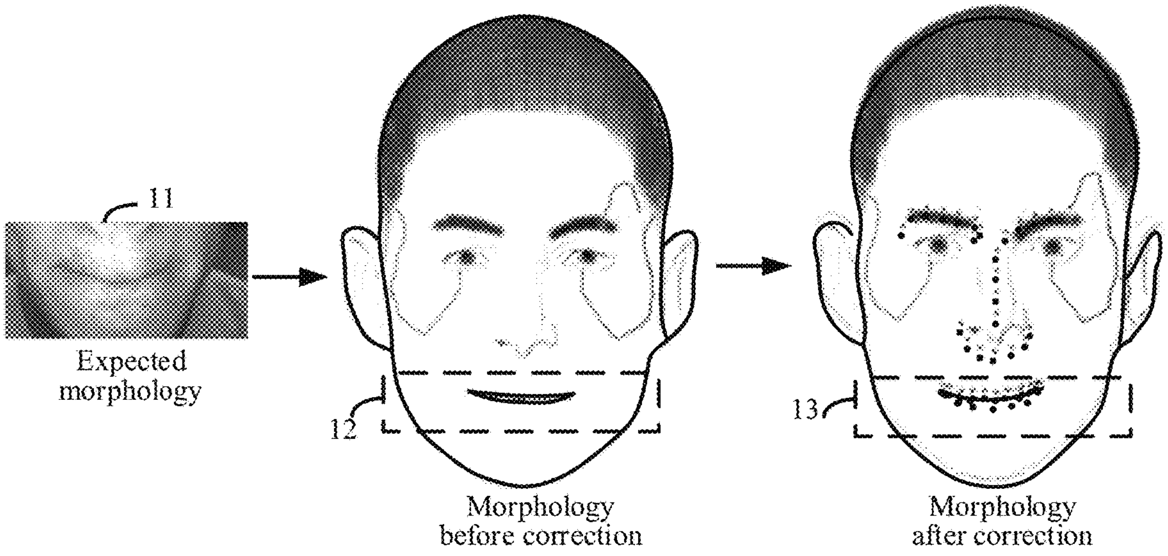
FIG. 1*b* is a schematic diagram of correcting a lip morphology according to some embodiments of the disclosure.

(2) The parameters of the morphology controller are edited by an animator according to the image including the face of the person so as to create corresponding expressions, for example, the morphology of the lips of the person in the image is shown as 11 in FIG. 1*b*, and the morphology of the lips is an expected morphology. The parameters of the morphology controller are edited to create expressions for the 3D character image, the morphology of the lips in the created expressions is shown as 12 in FIG. 1*b*, and the morphology of the lips can be regarded as the first morphology.

It can be found through comparison that the first morphology shown in 12 is different from the lip morphology (expected morphology) of the person in the image. Therefore, the lips can be subjected to morphology correction by the image processing method provided by some embodiments of the disclosure; specifically, the description information corresponding to the current morphology when the lips are in the current morphology is acquired, and the description information can be location information of a plurality of grids representing the lips in the image grid; the contour information of the lips in the current morphology is acquired; further, the morphology correction is performed based on the contour information and the description information; and the acquired corrected lip morphology is shown as 13 in FIG. 1*b*, and the lip morphology can be regarded as the second morphology.

As shown in FIG. 1*b*, the morphology corrected by the image processing method provided by some embodiments of the disclosure has a high matching degree with the expected morphology, and the image processing method provided by the disclosure does not need manual correction, so that the correction time can be saved, and the correction efficiency can be improved.

In some embodiments, the 3D characters can be virtual characters in a game application; before the game application is released formally, some expressions can be designed for the virtual characters in advance in order to achieve a more vivid game effect, thus the virtual characters can present different expressions in different game scenes, for example, in a game fight scene, the virtual characters can present a relatively excited expression, and after a game fight is successful, the virtual characters can present a smiling expression. Different expressions can be designed for the virtual characters through the operations (1) and (2), and if the morphology of the target part in the designed expressions is not matched with the expected morphology, the morphology of the target part can be modified through the image processing method provided by the disclosure, so that the expression of the virtual characters can be more accurate.

In some embodiments, the 3D characters can also be a virtual object in a scene for man-machine interaction based on the virtual object; and the scene for man-machine interaction based on the virtual object can be that the virtual object is a product customer service, and a user can discuss or know related products through chatting and interaction with the virtual object. In order to enable the user to experience the fidelity of chatting with a real person, several expressions can be designed for the virtual object in advance, and the virtual object can represent different labels in different chatting scenes. For example, if the chatting scene is that the user puts forward the product, the virtual object will present a smiling expression; and if the chatting scene is that the user is not satisfied with the product, the virtual object will present a sad expression. The expression can be designed for the virtual object through the operations (1) and (2), and if the morphology of the target part in the designed expressions is not matched with the expected morphology, the morphology of the target part can be corrected by the image processing method provided by the disclosure.

In other embodiments, the scene for man-machine interaction based on the virtual object can also be that the virtual object serves as a use guider of an application program, and when the user uses the application program for the first time, the virtual object can guide the user to use the application program through some limb operations. Or, the scene for man-machine interaction based on the virtual object can also be that the virtual object can be a virtual image of the user in a certain application program; the user can represent himself/herself through the virtual image, can perform session interaction with friends through the virtual image in the application program, or participates in some activities such as vegetable planting, meeting and friend making in simulated real life through the virtual image in the application program.

The scenes above are only the application scenes of the image processing method illustrated in some embodiments of the disclosure; and in specific implementation, the image processing method provided by some embodiments of the disclosure can be adopted for all application scenes related to object morphology correction, so that the purposes of saving the correction time and improving the correction efficiency can be achieved.

Figure 2:
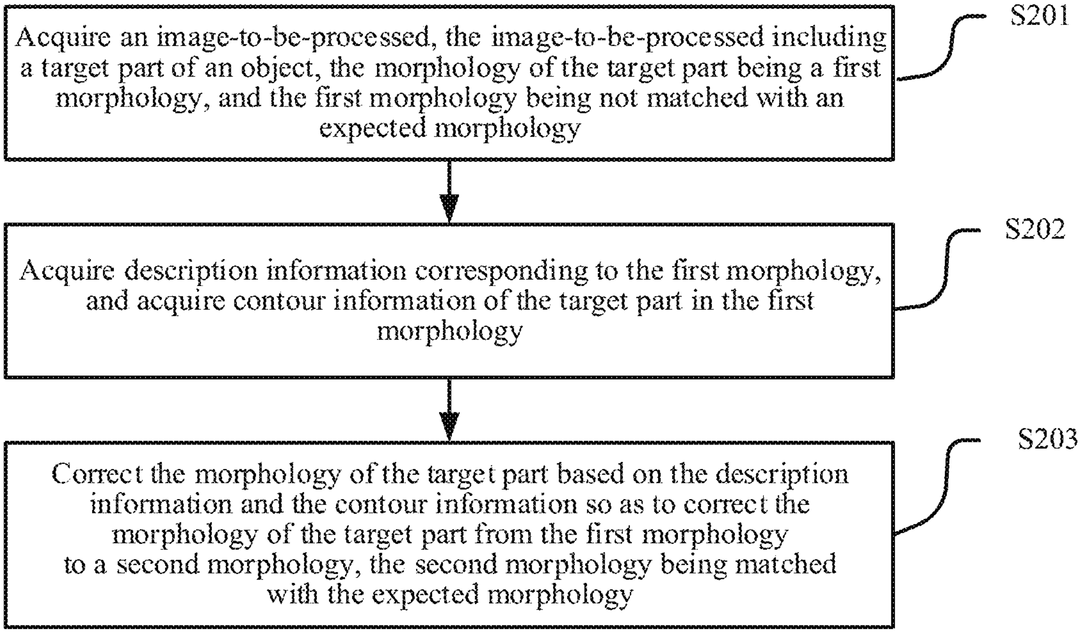
FIG. 2 is a flow schematic diagram of an image processing method according to some embodiments of the disclosure.

Based on the image processing solution, some embodiments of the disclosure provide an image processing method, as shown in FIG. 2, which is a flow schematic diagram of an image processing method according to some embodiments of the disclosure. The image processing method shown in FIG. 2 can be implemented by the computer device, and specifically can be implemented by a processor of the computer device, and the computer device specifically can be the image processing device or the image management device; and the image processing method shown in FIG. 2 can include the following operations:

S201: Acquire an image-to-be-processed, the image-to-be-processed including a target part of an object, the morphology of the target part being a first morphology, and the first morphology being not matched with an expected morphology.

The image-to-be-processed can be stored in the local computer device; at the moment, the computer device can directly acquire the image-to-be-processed from the local storage; or, the image-to-be-processed can be generated by other devices and stored in other devices; and at the moment, the computer device can receive the image-to-be-processed from other devices.

The image-to-be-processed can include the face of the object; the object can be any object with expressions such as a human or animal; and the image-to-be-processed can refer to the 3D character image in 3D character expression production, and the image-to-be-processed can be synthesized through a 3D technology, for example, 101 in FIG. 1*a* can represent one image-to-be-processed.

The target part of the object in the image-to-be-processed can refer to any one of five sense organs of the object face, such as eyes, eyebrows, nose, lips and ears. The morphology of the target part can be the first morphology, the first morphology can be generated through the face controller, and detailed description can refer to the previous introduction related to the face morphology determined through the face controller or the morphology controller, and is not repeated herein. It is assumed that the target part is the lips, the first morphology can include a mouth-opening state, a smiling state or a laughing, etc.

In some embodiments, the first morphology of the target part in the image-to-be-processed can be compared with the expected morphology to determine the matching condition between the first morphology and the expected morphology; if the first morphology is not matched with the expected morphology, it is needed to perform the subsequent operation S202 and operation S203 to perform morphology correction on the target part; and if the first morphology is matched with the expected morphology, operation S202 and operation S203 cannot be performed. For example, if the target part is the lips, the first morphology is the smiling state, the expected morphology is the mouth-opening laughing state, and at the moment, the first morphology is not matched with the expected morphology; or, the first morphology and the expected morphology are both the smiling state, but the first morphology may also be not matched with the expected morphology due to different smiling degrees.

In some embodiments, the comparing the first morphology of the target part in the image-to-be-processed with the expected morphology to determine the matching condition between the first morphology and the expected morphology can include: manually visually compare the first morphology with the expected morphology, and feed back the matching condition between the first morphology and the expected morphology to the computer device according to the comparison result.

In another embodiment, the comparing the first morphology of the target part in the image-to-be-processed with the expected morphology to determine the matching condition between the first morphology and the expected morphology can also include: perform similarity comparison processing on the target part in the first morphology and the target part in the expected morphology through an image similarity analysis technology to obtain the similarity between the target parts in the two morphologies; if the similarity comparison result is less than or equal to a similarity threshold value, determine that the first morphology is not matched with the expected morphology; and if the similarity result is greater than the similarity threshold value, determine that the first morphology is matched with the expected morphology.

The expected morphology can be any pre-specified morphology, and the expected morphology can be the morphology of the target part in the face of the object in any picture or any video, for example, the morphology of the target part of the person in the referred image is pre-specified as the expected morphology in the process of creating the 3D character expression.

S202: Acquire description information corresponding to the first morphology, and acquire contour information of the target part in the first morphology.

The image-to-be-processed can be associated with the image grid, the image grid can include M grid vertexes, and the grid vertexes are points composed of the grid; and the image grid includes a plurality of grids, and each grid can be composed of a plurality of vertexes. The target part corresponds to N grid vertexes in the M grid vertexes; the location change of the N grid vertexes (the location change of the N grid vertexes may refer to the change of any one or more grid vertexes in the N grid vertexes) may cause the target part to present different morphologies, so the location information of the N grid vertexes can be treated as the description information of the first morphology.

Figure 3:
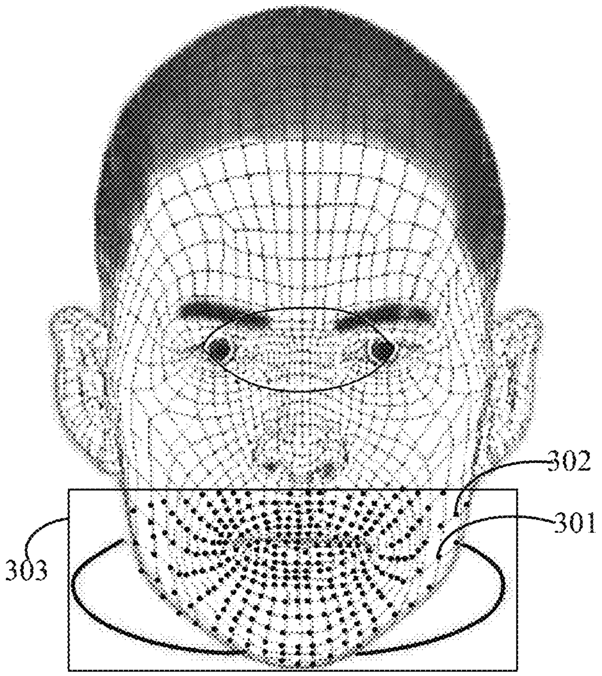
FIG. 3 is a schematic diagram of associating an image-to-be-processed with an image grid according to some embodiments of the disclosure.

For example, FIG. 3 is a schematic diagram of associating an image-to-be-processed with an image grid according to some embodiments of the disclosure; the image grid can include a plurality of grid vertexes, for example, 301 and 302 in FIG. 3 represent the grid vertexes, and each part of the face of the object in the image-to-be-processed can correspond to several grid vertexes, for example, the grid vertexes in the 303 area are the grid vertexes corresponding to the lips. It is assumed that the target part is the lips, the description information of the lips in the first morphology is the location information of the plurality of grid vertexes in the 303 area.

Figure 4A:
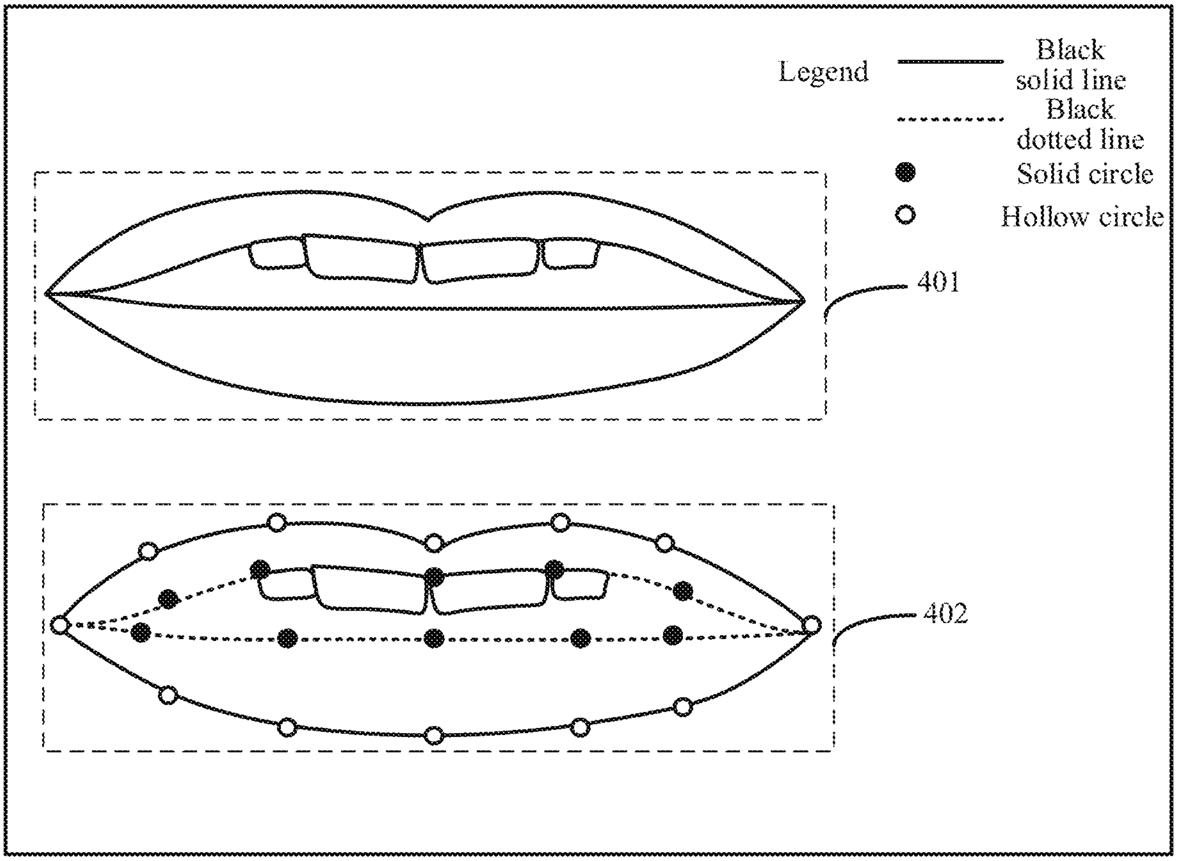
FIG. 4*a* is a schematic diagram of a contour of a target part and grid vertexes according to some embodiments of the disclosure.

In some embodiments, the target part can include an inner contour and an outer contour; the inner contour can correspond to L grid vertexes, and the outer contour can correspond to P grid vertexes, for example, the target part is the lips; FIG. 4*a* is a correspondence relationship between a contour of a target part and grid vertexes according to some embodiments of the disclosure, 401 in FIG. 4*a* represents the target part, a black dotted line in 402 represents the inner contour of the target part, and a black solid line represents the outer contour of the target part; and the solid circle represents the L grid vertexes corresponding to the inner contour, and the hollow circle represents the P grid vertexes corresponding to the outer contour.

Figure 4B:
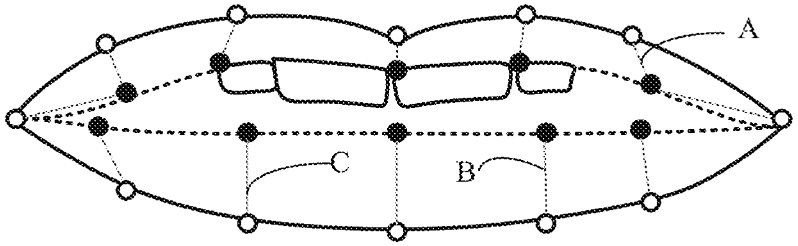
FIG. 4*b* is a schematic diagram of contour information of a target part according to some embodiments of the disclosure.

The contour information of the target part can include a first distance between the inner contour and the outer contour; specifically, the first distance between the inner contour and the outer contour can include the distance between the L grid vertexes and the grid vertexes with the correspondence relationship in the P grid vertexes; for example, as shown in FIG. 4*b*, in FIG. 4*b*, the solid circle and the hollow circle which are connected with each other are a group of grid vertexes with the correspondence relationship, and the distance between the solid circle and the hollow circle having the correspondence relationship is called as the first distance between the inner contour and the outer contour, and for example, the length of a line segment A, the length of a line segment B and the length of a line segment C are all the first distance.

Figure 4C:
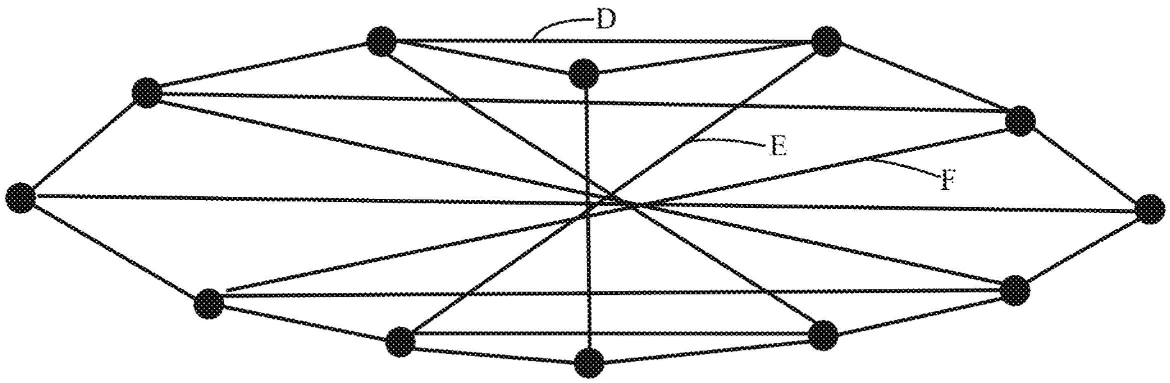
FIG. 4*c* is a schematic diagram of contour information of another target part according to some embodiments of the disclosure.

The contour information of the target part can also include a second distance between every two grid vertexes in the P grid vertexes corresponding to the outer contour, for example, as shown in FIG. 4*c*, the distance between every two solid circles (the solid circles in FIG. 4*c* are substantially hollow circles in FIG. 4*a* and FIG. 4*b*) in FIG. 4*c* is the second distance, and for example, the length of a line segment D, the length of a line segment E and the length of a line segment F are all the second distance.

S203: Correct the morphology of the target part based on the description information and the contour information so as to correct the morphology of the target part from the first morphology to a second morphology, the second morphology being matched with the expected morphology.

In some embodiments, the correcting the morphology of the target part based on the description information and the contour information so as to correct the morphology of the target part from the first morphology to a second morphology includes: predicate a target parameter based on the description information and the contour information, call the morphology controller to adjust the description information based on the target parameter, the adjusted description information being used for enabling the morphology of the target part to be presented as the second morphology.

A parameter prediction model can be called for predicating the target parameter based on the description information and the contour information, and the parameter prediction model can be obtained by pre-training. Specifically, in operation S203, the correcting the morphology of the target part based on the description information and the contour information so as to correct the morphology of the target part from the first morphology to the second morphology includes: splice the description information and the contour information; call the parameter prediction model for parameter prediction based on a splicing processing result to obtain the target parameter of the morphology controller; and call the morphology controller to adjust the description information based on the target parameter, the adjusted description information being used for enabling the morphology of the target part to be presented as the second morphology.

Specifically, the splicing the description information and the contour information includes: acquire a dimension reduction matrix, and perform dimension reduction processing on the description information through the dimension reduction matrix; and then splice the description information and the contour information after the dimension reduction processing. Herein, a principal component analysis (PCA) algorithm can be adopted to perform dimension reduction processing on the description information.

Figure 5:
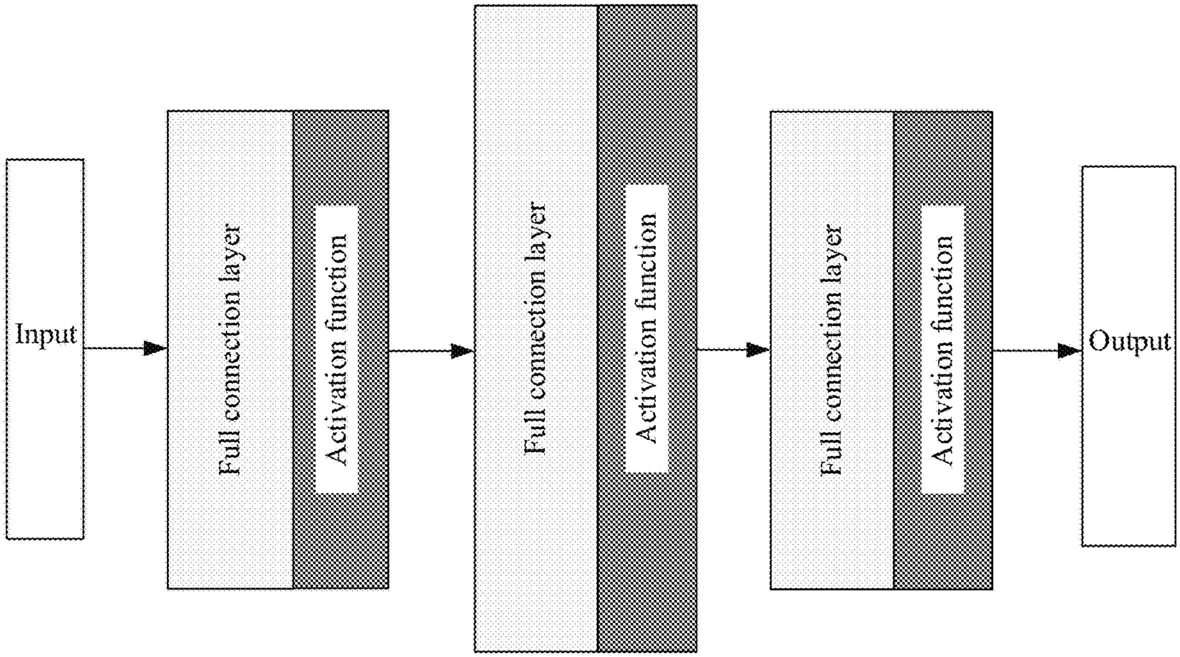
FIG. 5 is a structural schematic diagram of a parameter prediction model according to some embodiments of the disclosure.

In addition, the parameter prediction model can be of any depth network structure, as shown in FIG. 5, and FIG. 5 is a structural schematic diagram of a parameter prediction model according to some embodiments of the disclosure; and the parameter prediction model shown in FIG. 5 can include three full connection layers, each full connection layer can correspond to an activation function, and the activation function can be ReLU. The working principle of ReLU can be represented through a formula as $y$=ReLU($w$*x+b), x represents input, w represents the weight of the full connection layer, b represents bias, and y represents the output of the current layer.

In some embodiments of the disclosure, the target part of the face of the object in the image-to-be-processed is in the first morphology; if the first morphology is not matched with the expected morphology, the description information corresponding to the first morphology, and the contour information of the target part in the first morphology can be acquired; further, the morphology correction is performed on the target part based on the description information corresponding to the first morphology and the contour information of the target part so as to correct the morphology of the target part from the first morphology to a second morphology, and the second morphology is matched with the expected morphology; and therefore, it is not needed to manually correct the first morphology, the target part can be automatically subjected to morphology correction according to the description information of the first morphology and the contour information of the target part in the first morphology, and the morphology of the target part meets the expected morphology. Manpower resource consumption caused by manual correction is saved, and the morphology correction efficiency and accuracy are improved.

Figure 6:
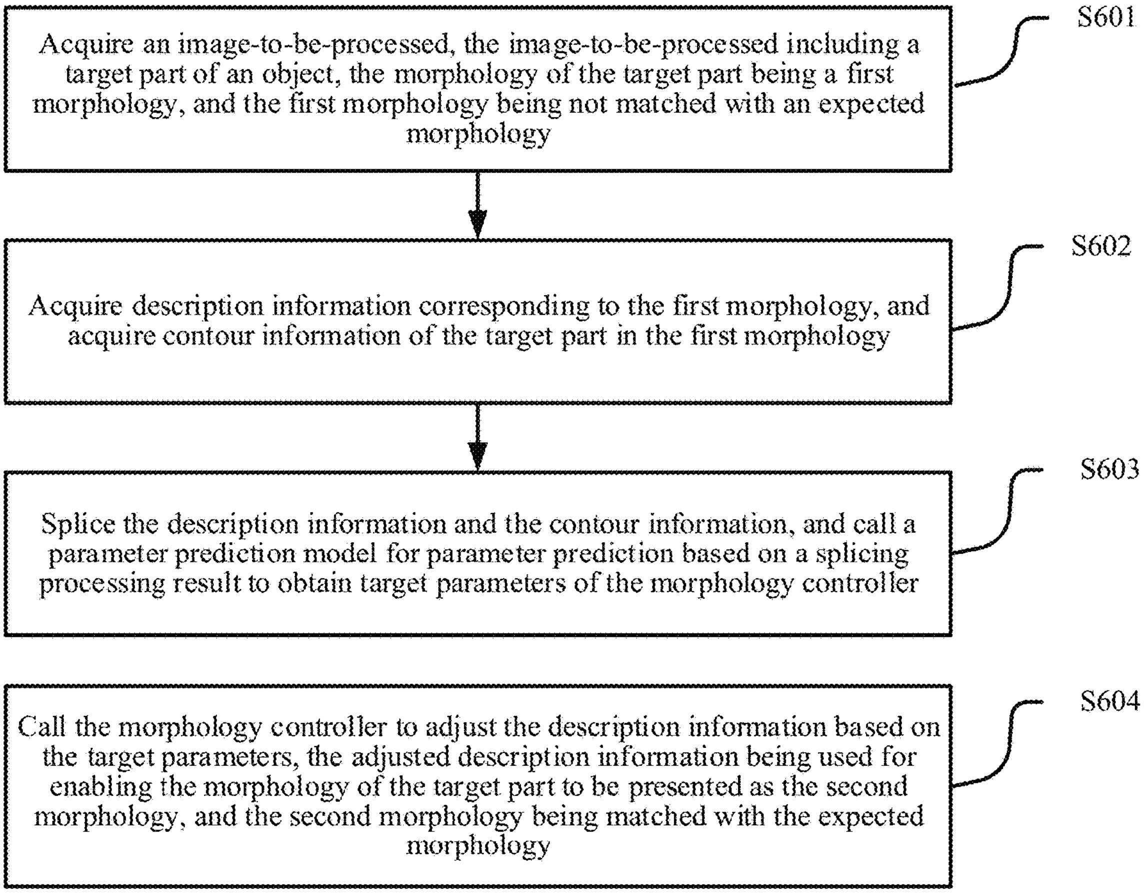
FIG. 6 is a flow schematic diagram of another image processing method according to some embodiments of the disclosure.

Based on the image processing method, some embodiments of the disclosure further provide another image processing method, as shown in FIG. 6, which is a flow schematic diagram of another image processing method according to some embodiments of the disclosure. The image processing method shown in FIG. 6 can be implemented by the computer device, and specifically can be implemented by the processor of the computer device, and the computer device specifically can be the above-mentioned image processing device or image management device. The image processing method shown in FIG. 6 can include the following operations:

S601: Acquire an image-to-be-processed, the image-to-be-processed including a target part of an object, the morphology of the target part being a first morphology, and the first morphology being not matched with an expected morphology.

S602: Acquire description information corresponding to the first morphology, and acquire contour information of the target part in the first morphology.

Some feasible implementations included in operation S601 can refer to related descriptions in operation S201 in some embodiments shown as FIG. 2, and are not repeated herein. Some feasible implementations included in S602 can refer to related descriptions in operation S202 in some embodiments shown as FIG. 2, and are not repeated herein.

S603: Splice the description information and the contour information, and call a parameter prediction model for parameter prediction based on a splicing processing result to obtain target parameters of the morphology controller.

In some embodiments, the parameter prediction model can be obtained by training based on a first training sample, and the process specifically includes the following operations S1-S4:

S1: Acquire the first training sample, the first training sample including first sample images and label information corresponding to each first sample image, the first sample images including target parts of the faces of the objects, and the label information corresponding to the first sample images including corresponding first description information of the target parts in the first sample images in a first training morphology, and corresponding second description information of the target parts in the first sample images in a second training morphology.

The first sample image corresponds to the image grid; five sense organs of the faces of the object in the first sample image correspond to several grid vertexes; and the target part can be the same as the target part in operation S601, and can be any one of the five sense organs. The corresponding first description information of the target part in the first sample image in the first training morphology can be the first location information of the plurality of grid vertexes corresponding to the target part in the image grid associated with the first sample image; and the corresponding second description information of the target part in the first sample image in the second training morphology can be the second location information of the plurality of grid vertexes corresponding to the target part. The first training morphology is not matched with the expected training morphology, and the second training morphology is matched with the expected training morphology. The determination mode of the expected training morphology can be the same as the determination mode of the expected morphology, and can be the morphology of the target parts of the persons in the reference image.

The number of first sample images can be X, X is an integer greater than or equal to 1. It is assumed that first description information is represented as $M_{coarse}$, the second description information is represented as $M_{fine}$, the number of the grid vertexes corresponding to the target parts is N1, each grid vertex has 3 dimensions, and then the dimension of $M_{coarse}$ is (X, N1*3), N1 is far less than X. In other words, if the number of the first sample images is X, the first description information includes the first description information of each first sample image, and the first description information of each first sample image can be regarded as a set of location information of N1 grid vertexes.

The first description information can include X rows, and each row includes the first location information of the N1 grid vertexes in a first sample image, for example, the first location information of one grid vertex can be represented through a three dimensional coordinate (x, y, z), and then each row of the first description information can be represented as ($x_1$, $y_1$, $z_1$, $x_2$, $y_2$, $z_3$, . . . , $x_{N1}$, $y_{N1}$, $z_{N1}$), namely, each row of the first description information is composed of location information of the N1 grid vertexes in a first sample image. Similarly, each row in the second description information is the second location information of N1 grid vertexes in a first sample image.

S2: Acquire training contour information of the target parts in the first sample images in the first training morphology, and splice the training contour information and first description information.

Unless otherwise specified, a first sample image is taken as an example for illustrating herein, the same processing operations are adopted for other first sample images, and the training contour information of the target part in each first sample image in the first training morphology can be obtained.

In some embodiments, according to some embodiments of the disclosure, the training contour information of the target part in the first sample image in the first training morphology can be acquired through the same mode as the contour information of the target part in the image-to-be-processed obtained in operation S202 in the first morphology, and the specific implementation can refer to the description in operation S202, and is not repeated herein.

In some embodiments, in order to reduce the sparsity of features and improve the learning efficiency of the parameter prediction model, dimension reduction processing can be performed on the first description information before splicing the training contour information and the first description information, and splicing processing is performed on the first description information and the training contour information after the dimension reduction processing. The dimension reduction processing can be performed on the first description information by a PCA algorithm. The principle of dimension reduction processing by the PCA algorithm is that a dimension reduction matrix is generated based on the first description information and the second description information; and the first description information and the dimension reduction matrix are multiplied to obtain the first description information after the dimension reduction processing. It is assumed that the first description information is represented as $M_{coarse}$, the dimension reduction matrix is represented as $D_K$, and the performing dimension reduction processing on the first description information can be represented by the following formula (1):

$$MD_{coarse}=M_{coarse}*D_K \tag{1}$$

where $MD_{coarse}$ represents the first description information after the dimension reduction processing; and it is assumed that the dimension of the dimension reduction matrix is (N1*3, K), the dimension of the first description information is (X, N1*3), and after dimension reduction processing, the dimension of the first description information is reduced to (X, K), and K is an integer far less than N1*3.

In some embodiments, the generating the dimension reduction matrix based on the first description information and the second description information includes:

S21: Splice the first description information and the second description information to obtain a description information matrix; and assume the first description information as $M_{coarse}$, and the second description information as $M_{fine}$, and the dimensions of the first description information and the second description information both being (X, N1*3). The first description information and the second description information are spliced to obtain the description information matrix represented as M, the dimension of M being (X*2, N1*3). The splicing the first description information and the second description information can be represented by the following formula (2):

$$M=\begin{bmatrix} M_{coarse} \\ M_{fine} \end{bmatrix} \tag{2}$$

S22: Perform singular value decomposition processing on the description information matrix to obtain an eigenvector matrix and an eigenvalue matrix, the eigenvector matrix including a plurality of eigenvectors, the eigenvalue matrix including eigenvalues corresponding to the eigenvectors, and the eigenvectors in the eigenvector matrix corresponding to the eigenvalues in the eigenvalue matrix one to one. The process of performing singular value decomposition processing on the description information matrix can be represented by the following formula (3):

$$M=UVD^T \tag{3}$$

in the formula (3), D represents the eigenvector matrix, the dimension is (N1*3, N1*3); V represents the eigenvalue matrix, V is a non-negative rectangular diagonal matrix, the dimension is (X*2, N1*3); and the value on the diagonal line of the eigenvalue matrix V is the eigenvalue corresponding to each eigenvector, U is a matrix orthogonal to D, and the dimension is the same as D.

S23: Adjust the eigenvector matrix, and arrange a plurality of eigenvectors in the adjusted eigenvector matrix according to the corresponding eigenvalues from large to small. It is assumed to arrange the eigenvalues of the plurality of eigenvectors from large to small as $x_1$, $x_2$, $x_3$, . . . , $x_{N1*3}$.

S24: Select K eigenvectors in sequence according to the eigenvalue of each eigenvector in the adjusted eigenvector matrix, determine the matrix composed of the K eigenvectors as a dimension reduction matrix, and enable the sum of the eigenvalues corresponding to the K eigenvectors to be greater than or equal to a feature threshold value. In other words, the selected K eigenvectors need to ensure that information greater than or equal to the feature threshold value in the description information matrix is reserved.

In specific implementation, it is assumed that $x=x_1+x_2+x_3+\ldots+x_{N1*3}$, K is a first value which enables the following formula (4):

$$\frac{x_1+x_2+\ldots+x_k}{x} \geqslant \text{feature threshold value} \tag{4}$$

Generally, the feature threshold value can be 99%. After K is solved through the formula (4), a matrix composed of the first K eigenvectors is determined as the dimension reduction matrix, the dimension of the dimension reduction matrix is (N1*3, K), and K is far less than N1*3.

S3: Call a to-be-trained parameter prediction model for parameter prediction based on the splicing processing result to obtain training parameters of the morphology controller.

As described above, if the number of first sample images can be X, the number of first description information and the number of training contour information are X, and the splicing processing result herein can be obtained by splicing the first description information and the training contour information corresponding to any first sample image; that is, a splicing processing result can be obtained by splicing the first description information and the training contour information corresponding to each first sample image in the X first sample images; and for the first training sample, the number of the splicing processing results is also X. During training the parameter prediction model, the X splicing results can be input into the parameter prediction model one by one. Specifically, it is assumed that the number of the first sample images is X, the target part in each first sample image corresponds to N1 grid vertexes, the location information of each grid vertex is 3D, the dimension of the first description information is represented as (X, N1*3), the dimension of the first description information is represented as (X, K) after dimension reduction processing, and the dimension of the training contour information is represented as (X, D). After the first description information and the training contour information subjected to dimension reduction processing are spliced, the dimension of the splicing processing result is (X, K+D).

Figure 7A:
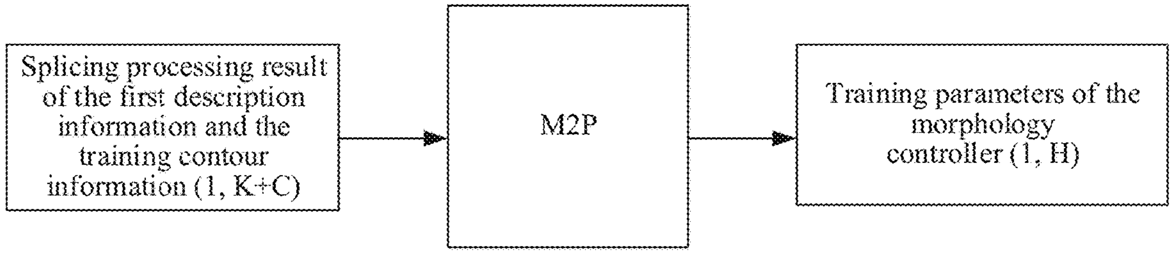
FIG. 7*a* is a schematic diagram of training a parameter prediction model according to some embodiments of the disclosure.

During training the parameter prediction model, after the first description information and the training contour information corresponding to a first sample image are spliced each time, the splicing processing result is input into the parameter prediction model, the high-parameter prediction model outputs a training parameter, and the process of performing parameter prediction processing by the parameter prediction model based on one splicing processing result can be represented by FIG. 7*a*. The parameter prediction model can also be called (Meah2Params), the dimension of the splicing processing result input into the parameter prediction model each time is (1, K+C), the dimension of the training parameter outputted by the parameter prediction model is (1, H), and H represents the number of parameters used for controlling the morphology of the target part in the morphology controller.

S4: Perform description information prediction based on the training parameters to obtain corresponding first prediction description information of the target part in the second training morphology, and train the parameter prediction model according to the first prediction description information and the second description information.

The training the parameter prediction model according to the first prediction description information and the second description information specifically includes: compute a first loss function based on the first prediction description information and the second description information; and update network parameters in the parameter prediction model based on the first loss function by a back propagation algorithm.

For example, the computing the first loss function based on the first prediction description information and the second description information can be represented by the following formula (5):

$$L_{loss}=\text{MeanSquaredError}(MD_{predict}, MD_{fine}) \quad (5)$$

in the formula (5), $L_{loss}$ represents the first loss function; $MD_{predict}$ represents the first prediction description information; $MD_{fine}$ represents the second description information; and MeanSquaredError (•) represents a mean square error computation function.

The updating network parameters by computing a partial derivative of the first loss function to the network parameters can be represented by the following formula (6):

$$w_{t+1} = w_t - \alpha\frac{\partial L_{loss}}{\partial w_t} \quad (6)$$

Where $w_t$ represents the network parameters in the parameter prediction model before updating; $w_{t+1}$ represents the updated network parameters; and α represents the learning rate, and is generally about 10e-3. The network parameters are continuously and iteratively optimized until the first loss function does not change any more.

In some embodiments, a location predication model can be called for the description information prediction based on the training parameters to obtain corresponding first prediction description information of the target part in the second training morphology. In specific implementation, the training parameters serve as input of the location prediction model, and the location prediction model is called for description information prediction to obtain the first prediction description information. Therefore, the location prediction model has the effect of predicating to obtain the description information according to parameters of the morphology controller, in other words, the location prediction model can simulate the process that the morphology controller controls the description information based on the parameters.

The location prediction model can be a pre-trained model, and the location prediction model can be obtained by training based on a second training sample; the second training sample includes a second sample image and a correspondence relationship between third description information and a second training parameter of the morphology controller; the second sample image includes the target part of the face of the object; and the third description information is corresponding description information of the target part in the second sample image in a third morphology. The correspondence relationship between the third description information in the second training sample and the second training parameter in the morphology controller can include a plurality of groups. The third morphology of the target part in the second sample image can be a morphology matched with an expected training morphology, and can also be a morphology which is not matched with the expected training morphology, for example, if the expected training morphology refers to the morphology of the target part in the expressions of the persons in the reference image, the third morphology can be a morphology automatically generated by the morphology controller based on the expression of the persons, and the morphology may have an error relative to the expected training morphology and is not very accurate. Or, the third morphology can be a morphology obtained after the morphology controller automatically generates a morphology based on the expressions of the persons in the reference image and manually adjusts the automatically generated morphology, and at the moment, the third morphology is matched with the expected training morphology. The expected training morphology herein can be the same as or different from the expected training morphology.

The second sample image can correspond to the image grid; the target part corresponds to some grid vertexes in the image grid; and the third description information of the target part in the third morphology refers to the location information of the grid vertexes corresponding to the target part. The correspondence relationship between the third description information and the second training parameter in the morphology controller can be determined based on the morphology controller and the third description location information; and specifically, a second training parameter can be randomly generated in the morphology controller, the morphology of the target part in the second sample image is modified based on the second training parameter, and at the moment, the third description information corresponding to the morphology of the target part is the third description information corresponding to the current second training parameter. The process is repeated for several times to obtain the correspondence relationship between a plurality of groups of third description information and second training parameters.

Figure 7B:
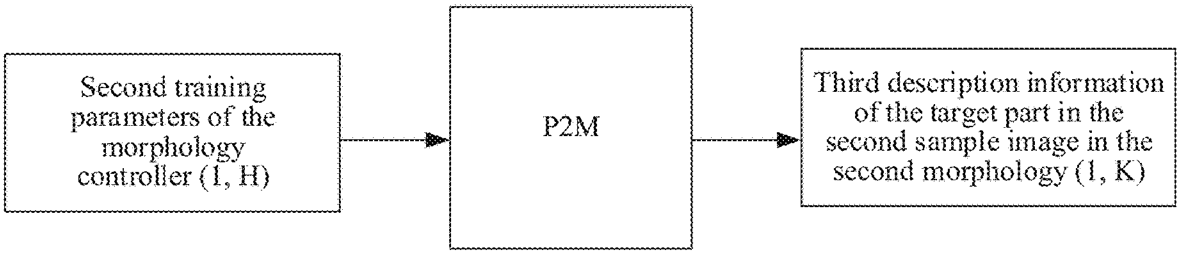
FIG. 7*b* is a schematic diagram of training a location prediction model according to some embodiments of the disclosure.

Further, a group of third description information and second training parameters are used as a training data pair; the location prediction model is called for description information prediction based on the second training parameters in the training data pair so as to obtain the second prediction description information. The third description information herein is subjected to dimension reduction processing through the dimension reduction matrix; it is assumed that the correspondence relationship between X groups of third description information and second training parameters is obtained, the dimension of each piece of description information is 3, each piece of description information corresponds to the N1 grid vertexes, and the dimension of the third description information is (X, N1*3); the dimension reduction processing is performed on the third description information through the obtained matrix, and the dimension of the third description information after dimension reduction is (X, K); and it is assumed that the second training parameters include H parameters, the dimension of the second training parameters is (X, H). As shown in FIG. 7*b*, which is a training schematic diagram of a location prediction model according to some embodiments of the disclosure; the location prediction model can also be called Params2Mesh (P2M); the second training parameter in the training data pair is input into the P2M model each time, and the dimension of the second training parameter input into the P2M model at the moment is (1, H); the P2M model predicts the description information based on the second training parameter and outputs the second prediction description information; and the dimension of the second prediction description information is (1, K).

Then, the location prediction model is trained based on the second prediction description information and third description information. Specifically, a second loss function corresponding to the location prediction model is determined based on the second prediction description information and the third description information; and the network parameter in the location prediction model is updated by computing the partial derivative of the second loss function to the network parameter in the location prediction model, so that the training of the location prediction model is realized. For example, the second loss function corresponding to the location prediction model is determined based on the second prediction description information and the third description information, and it can be represented by the following formula (7):

$$L_{loss'}=\text{MeanSquareError}(M_{predict'}M_{ground\ truth}) \quad (7)$$

where $L_{loss'}$ represents the second loss function, $M_{predict'}$ represents the second prediction description information, and $M_{ground\ truth}$ represents the third description information.

The updating the network parameter by computing the partial derivative of the second loss function to the network parameter in the location prediction model can be represented by the following formula (8):

$$w'_{t+1} = w'_t - \alpha\frac{\partial L_{loss'}}{\partial w'_t} \quad (8)$$

in the formula (8), $w'_{t+1}$ represents the updated network parameters in the location prediction model, and $w'_t$ represents the network parameters in the location prediction model before updating.

In some embodiments, the location prediction model can also be of an arbitrary deep network structure, as long as the input and output requirements can be met, iterative optimization can be performed by training, and finally the parameters of the controller can be input to obtain correct description information. According to some embodiments of the disclosure, the location prediction model can have the same network structure as the parameter prediction model, as shown in FIG. 5; the difference between the location prediction model and the parameter prediction model is as follows: the input data is different, the input data of the location prediction model is the parameters of the morphology controller, and the input data of the parameter prediction model is the description information; the output data is different, the output data of the location prediction model is description information, and the output data of the parameter prediction model is parameters of the morphology controller; and the number of hidden elements in each full connection layer is different.

S604: Call the morphology controller to adjust the description information based on the target parameters, the adjusted description information being used for enabling the morphology of the target part to be presented as the second morphology, the second morphology being matched with the expected morphology.

In some embodiments, some feasible implementations included in S604 can refer to related descriptions of S203 in some embodiments in FIG. 2, and are not repeated herein.

Figure 8:
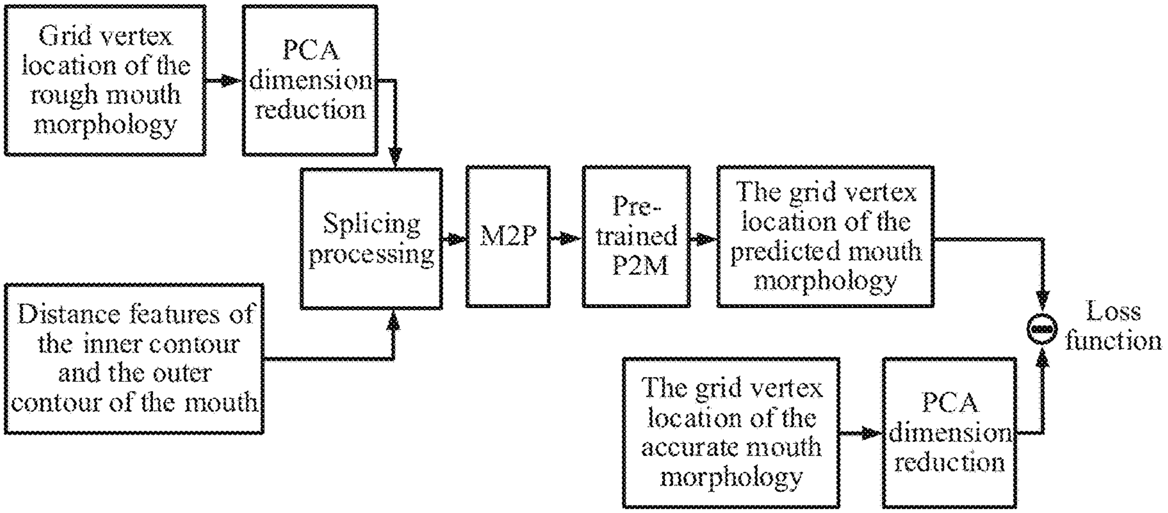
FIG. 8 is a schematic diagram of training another parameter prediction model according to some embodiments of the disclosure.

Based on the description of S1-S4, some embodiments of the disclosure provide a training schematic diagram of a parameter prediction model, as shown in FIG. 8. In FIG. 8, it is assumed that the target part refers to the lips; the label information corresponding to the first sample image includes the corresponding first description information of the lips in the first sample image in the first training morphology, and the first description information is not matched with the expected training morphology, so the first description information can be understood as the grid vertex location of a rough mouth morphology; the label information further includes the corresponding second description information of the lips in the first sample image in the second training morphology, and the second description information is matched with the expected training morphology, so the second description information can be understood as the grid vertex location of the accurate mouth morphology.

The training contour information can refer to the contour information of the mouth, the contour information of the mouth includes the distance between the inner contour and the outer contour and the distance between every two grid vertexes in the outer contour, and the distances are collectively called as distance features of the inner contour and the outer contour of the mouth.

After PCA dimension reduction processing is performed on the grid vertex position of the rough mouth morphology, splicing is performed with the distance features of the inner contour and the outer contour of the mouth; the data obtained after splicing is input into the parameter prediction model M2P, and the M2P performs parameter prediction based on the input data and outputs the training parameters; the training parameters are used as input data of the location prediction model P2M, the P2M performs description information prediction based on the input training parameters to obtain the first prediction description information, and the first prediction description information can be understood as the predicted grid vertex location of the mouth morphology; and further, further, the loss function of the parameter prediction model M2P is computed according to the predicted grid vertex location of the mouth morphology and the grid vertex location of the accurate mouth morphology after dimension reduction processing, and the M2P model is trained based on the loss function.

In some embodiments of the disclosure, the M2P model is obtained by the first sample training, and the M2P model can predict accurate description information according to the rough description information and the contour information of the target part. The trained M2P model is adopted to correct the morphology of the target part to obtain the target part morphology matched with the expected morphology; and through the trained M2P model, manpower resources consumed by manual correction can be saved, and errors caused by manual correction are avoided, so that the morphology correction efficiency and accuracy are improved.

Figure 9:
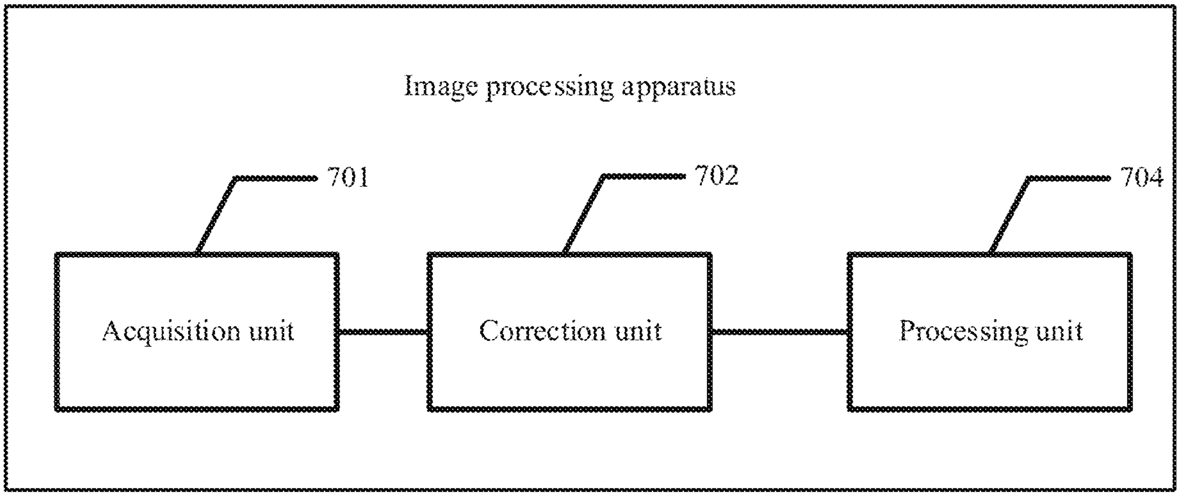
FIG. 9 is a structural schematic diagram of an image processing apparatus according to some embodiments of the disclosure.

Based on some embodiments of the image processing method, some embodiments of the disclosure provide an image processing apparatus, as shown in FIG. 9, which is a structural schematic diagram of an image processing apparatus according to some embodiments of the disclosure. The image processing apparatus shown in FIG. 9 can operate the following units:

- an acquisition unit 701, configured to acquire an image-to-be-processed, the image-to-be-processed including a target part of the face of an object, the morphology of the target part being a first morphology, and the first morphology being not matched with an expected morphology;
- the acquisition unit 701, further configured to acquire description information corresponding to the first morphology and acquire contour information of the target part in the first morphology; and
- a correction unit 702, configured to correct the morphology of the target part based on the description information and the contour information so as to correct the morphology of the target part from the first morphology to a second morphology, the second morphology being matched with the expected morphology.

In some embodiments, the target part is bound to a morphology controller, and when the correction unit 702 corrects the morphology of the target part based on the description information and the contour information so as to correct the morphology of the target part from the first morphology to a second morphology, the following operations are implemented:

In some embodiments, the target part is bound to a morphology controller, and when the correction unit 902 corrects the morphology of the target part based on the description information and the contour information so as to correct the morphology of the target part from the first morphology to a second morphology, the following operations are implemented:

- splice the description information and the contour information;
- call a parameter prediction model for parameter prediction based on a splicing processing result to obtain a target parameter of the morphology controller; and
- call the morphology controller to adjust the description information based on the target parameter, the adjusted description information being used for enabling the morphology of the target part to be presented as the second morphology.

In some embodiments, when the correction unit 702 splices the description information and the contour information, the following operations are implemented:

- acquire a dimension reduction matrix, and perform dimension reduction processing on the description information through the dimension reduction matrix; and
- splice the description information and the contour information after the dimension reduction processing.

In some embodiments, the image-to-be-processed is associated with an image grid, and the image grid includes M grid vertexes; the target part corresponds to N grid vertexes in the M grid vertexes, M and N are integers larger than 1, and N is less than or equal to M; and the description information corresponding to the first morphology includes location information of the N grid vertexes.

In some embodiments, the target part includes an inner contour and an outer contour, the inner contour corresponds to L grid vertexes, the outer contour corresponds to P grid vertexes, and the sum of L and P is less than N;

- the contour information of the target part includes a first distance between the inner contour and the outer contour and a second distance between every two grid vertexes in the P grid vertexes corresponding to the outer contour; and the first distance includes the distance between the L grid vertexes and the grid vertexes with the correspondence relationship in the P grid vertexes.

In some embodiments, the image processing apparatus in FIG. 9 further includes a processing unit 704;

- the acquisition unit 701 is further configured to acquire a first training sample, the first training sample including a first sample image and label information corresponding to the first sample image, the first sample image including the target part of the face of the object, the label information including corresponding first description information of the target part in the first sample image in the first training morphology and corresponding second description information of the target part in the first sample image in the second training morphology, and the first training morphology being not matched with an expected training morphology, and the second training morphology being matched with the expected training morphology;
- the acquisition unit 701 is further configured to acquire training contour information of the target part in the first sample image in the first training morphology, and splice the training contour information and the first description information;
- the processing unit 704 is configured to call the to-be-trained parameter prediction model for parameter prediction based on the splicing processing result so as to obtain training parameters of the morphology controller; and perform the description information prediction based on the training parameters to obtain corresponding first prediction description information of the target part in the second training morphology, and train the parameter prediction model according to the first prediction description information and the second description information.

In some embodiments, when the processing unit 704 performs description information prediction based on the training parameters to obtain the corresponding first prediction description information of the target part in the second training morphology, the following operations are implemented:

input the training parameters as input of the location prediction model, and call the location prediction model for description information prediction to obtain first prediction description information, the location prediction model being configured to predict description information according to the parameters of the morphology controller.

In some embodiments, the acquisition unit 701 is further configured to acquire a second training sample, the second training sample including a second sample image and a correspondence relationship between third description information and a second training parameter of the morphology controller, the second sample image including the target part of the face of the object, and the third description information referring to the corresponding description information of the target part in the second sample image in a third morphology;

the processing unit 704 is also configured to call the to-be-trained location prediction model for description information prediction based on the second training parameter to obtain second prediction description information; and train the location prediction model based on the second prediction description information and the third description information.

In some embodiments, when the processing unit 903 trains the parameter prediction model according to the difference between the first prediction description information and the second description information, the following operations are implemented:

determine a first loss function corresponding to the parameter prediction model based on the first prediction description location information and the second description information; and update the network parameters in the parameter prediction model based on the first loss function by a back propagation algorithm. In some embodiments, when the acquisition unit 701 splices the training contour information and the first description information, the following operations are implemented:

acquire a dimension reduction matrix, and perform dimension reduction processing on the first description information through the dimension reduction matrix; and splice the first description information and the training contour information after the dimension reduction processing.

In some embodiments, when the acquisition unit 701 acquires the dimension reduction matrix, the following operations are implemented:

splice the first description information and the second description information to obtain a description information matrix;

perform singular value decomposition processing on the description information matrix to obtain an eigenvector matrix and an eigenvalue matrix, the eigenvector matrix including a plurality of eigenvectors, and the eigenvalue matrix including an eigenvalue corresponding to each eigenvector matrix;

adjust the eigenvector matrix, and arrange the plurality of eigenvectors in the adjusted eigenvector matrix according to the corresponding eigenvalues from large to small; and select K eigenvectors in sequence according to the eigenvalue of each eigenvector in the adjusted eigenvector matrix, and determine the matrix composed of the selected K eigenvectors as a dimension reduction matrix, the sum of the eigenvalues corresponding to the K eigenvectors being greater than or equal to a feature threshold value.

According to some embodiments of the disclosure, each of the operations involved in the image processing methods shown in FIG. 2 and FIG. 6 may be implemented by each unit in the image processing apparatus shown in FIG. 9. For example, operation S201 and operation S202 shown in FIG. 2 may be implemented by the acquisition unit 701 in the image processing apparatus shown in FIG. 9, and operation S203 may be implemented by the correction unit 702 in the image processing apparatus shown in FIG. 9, for another example, operation S601 and operation S602 may be implemented by the acquisition unit 701 in the image processing apparatus shown in FIG. 9; and operation S603 and operation S604 may be implemented by the processing unit 704 in the image processing apparatus shown in FIG. 9.

According to another embodiment of the disclosure, each unit in the image processing apparatus shown in FIG. 9 can be respectively or completely combined into one or more other units, or one (some) of the units can be further split into a plurality of units with smaller functions, and thus the same operation can be realized without affecting the implementation of the technical effect of some embodiments of the disclosure. The above-mentioned units are divided based on logical functions. In an actual application, a function of one unit may be implemented by multiple units, or functions of a plurality of units are implemented by one unit. In another embodiment of the disclosure, the image processing apparatus may also include another unit. During practical application, these functions may also be cooperatively implemented by another unit and may be cooperatively implemented by the plurality of units.

According to another embodiment of the disclosure, computer programs (including program codes) capable of implementing the operations of the corresponding methods shown in FIG. 2 and FIG. 9 can be operated in general purpose computation devices such as a computer including processing elements and storage elements such as a central processing unit (CPU), a random access storage medium (RAM), and a read only storage medium (ROM) to construct the image processing apparatus as shown in FIG. 9 and implement the image processing method according to some embodiments of the disclosure. The computer programs can be recorded on, for example, a computer readable storage medium, and loaded in the image processing device through the computer readable storage medium and operated in the image processing apparatus.

In some embodiments of the disclosure, the target part of the face of the object in the image-to-be-processed is in the first morphology; if the first morphology is not matched with the expected morphology, the description information corresponding to the first morphology and contour information of the target part in the first morphology can be acquired; further, the morphology correction is performed on the target part based on the description information corresponding to the first morphology and the contour information of the target part so as to correct the morphology of the target part from the first morphology to a second morphology, the second morphology is matched with the expected morphology. So that it is not needed to manually correct the first morphology, the morphology of the target part is automatically corrected according to the description information of the first morphology and the contour information of the target part in the first morphology, and as a result, the morphology of the target part conforms to the expected morphology. The manpower resource consumption caused by manual correction is saved, and the morphology correction efficiency is improved.

Figure 10:
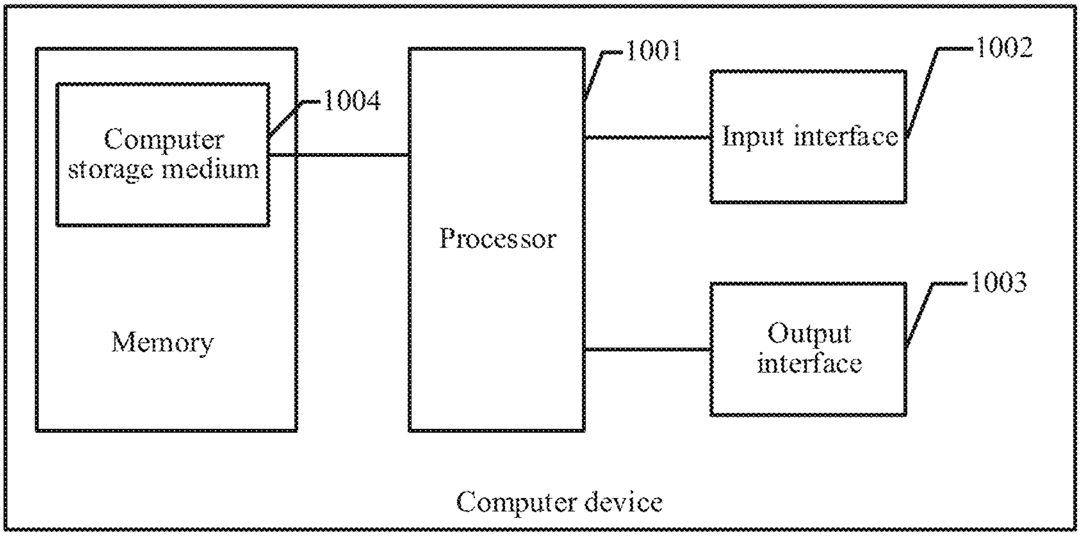
FIG. 10 is a structural schematic diagram of a computer device according to some embodiments of the disclosure.

Based on some embodiments of the image processing method and some embodiments of the image processing apparatus, some embodiments of the disclosure provide a computer device. As shown in FIG. 10, which is a structure schematic diagram of a computer device according to some embodiments of the disclosure; the computer device shown in FIG. 10 can include a processor 1001, an input interface 1002, an output interface 1003 and a computer storage medium 1004. The processor 1001, the input interface 1002, the output interface 1003 and the computer storage medium 1004 can be connected through a bus or other modes.

The computer storage medium 1004 can be stored in a memory of the image processing device, the computer storage medium 1004 is configured to store the computer programs, and the processor 1001 is configured to execute the computer programs stored in the computer storage medium 1004. The processor 1001 (or called a CPU (Central Processing Unit)) is a computing core and a control core of the computer device, is suitable for implementing one or more computer programs, and is specifically suitable for loading and executing the image processing method provided by some embodiments of the disclosure.

Some embodiments of the disclosure also provide a computer storage medium (Memory), which is a memory device of the computer device and is configured to store programs and data. It is to be understood that the computer storage medium can include a built-in storage medium of the computer device and can also include an extended storage medium supported by the computer device. The computer storage medium provides a storage space, and the storage space stores an operating system of the computer device. Moreover, one or more computer programs suitable for being loaded and executed by the processor 1001 are also stored in the storage space. The computer storage medium can be a high-speed RAM memory, can also be a non-unstable memory, such as at least one disk memory, and can in some embodiments be at least one computer storage medium located far away from the processor.

In some embodiments, one or more computer programs stored in the computer storage medium can be loaded and executed by the processor 1001 and can implement the image processing method provided by some embodiments of the disclosure.

What is claimed is:

1. An image processing method, implemented by a computer device, comprising:

acquiring an image-to-be-processed, the image-to-be-processed comprising a target part of an object, a morphology of the target part being a first morphology, and the first morphology being not matched with an expected morphology;

acquiring description information corresponding to the first morphology, and acquiring contour information about the target part in the first morphology;

acquiring a dimension reduction matrix and performing dimension reduction processing on the description information through the dimension reduction matrix, and splicing the description information and the contour information after the dimension reduction processing;

calling a parameter prediction model for parameter prediction based on the splicing processing result to obtain a target parameter; and correcting the morphology of the target part based on the target parameter in order to correct the morphology of the target part from the first morphology to a second morphology, the second morphology being matched with the expected morphology, wherein the parameter prediction model is trained based on first prediction description information about the target part in a training morphology that matches with an expected training morphology, the first prediction description information being generated based on training parameters of a morphology controller generated by the parameter prediction model.

2. The method according to claim 1, wherein the target part is bound to the morphology controller, and wherein the correcting the morphology comprises:

calling the morphology controller to adjust the description information based on the target parameter, the adjusted description information being used to enable the morphology of the target part to be presented as the second morphology.

3. The method according to claim 2, further comprising:

acquiring a first training sample, wherein the first training sample comprises a first sample image and label information corresponding to the first sample image, wherein the first sample image comprises the target part of the object, wherein the label information comprises corresponding first description information about the target part in the first sample image in first training morphology and corresponding second description information about the target part in the first sample image in second training morphology, wherein the first training morphology is not matched with the expected training morphology, and the second training morphology is matched with the expected training morphology;

acquiring training contour information about the target part in the first sample image in the first training morphology, and splicing the training contour information and the first description information;

training the parameter prediction model according to the first prediction description information and the second description information.

4. The method according to claim 3, wherein the method further comprises:

acquiring a second training sample, the second training sample comprising a second sample image and a correspondence relationship between third description information and a second training parameter of the morphology controller, the second sample image comprising the target part of the object, and the third description information referring to the corresponding description information about the target part in the second sample image in a third training morphology;

calling the location prediction model based on the second training parameter to obtain second prediction description information; and training the location prediction model based on the second prediction description information and the third description information.

5. The method according to claim 3, wherein training the parameter prediction model comprises:

determining a first loss function corresponding to the parameter prediction model based on the first prediction description information and the second description information; and updating network parameters in the parameter prediction model based on the first loss function by a back propagation algorithm.

6. The method according to claim 3, wherein the splicing the training contour information and the first description information comprises:

acquiring the dimension reduction matrix and performing dimension reduction processing on the first description information through the dimension reduction matrix; and splicing the first description information and the training contour information after the dimension reduction processing.

7. The method according to claim 6, wherein acquiring the dimension reduction matrix comprises:

splicing the first description information and the second description information to obtain a description information matrix;

performing singular value decomposition processing on the description information matrix to obtain an eigenvector matrix and an eigenvalue matrix, the eigenvector matrix comprising a plurality of eigenvectors, and the eigenvalue matrix comprising an eigenvalue corresponding to each eigenvector;

adjusting the eigenvector matrix, and arranging the plurality of eigenvectors in the adjusted eigenvector matrix according to corresponding eigenvalues from large to small; and selecting K eigenvectors in a sequence according to an eigenvalue corresponding to each eigenvector in the adjusted eigenvector matrix, determining a matrix including the selected K eigenvectors as the dimension reduction matrix, and enabling the sum of the eigenvalues corresponding to the K eigenvectors to be greater than or equal to a feature threshold value.

8. The method according to claim 1, wherein the image-to-be-processed is associated with an image grid, the image grid comprises M grid vertexes, and the target part corresponds to N grid vertexes in the M grid vertexes, where M and N are integers larger than 1, and N is less than or equal to M, and wherein the description information corresponding to the first morphology comprises location information of the N grid vertexes.

9. The method according to claim 8, wherein the target part comprises an inner contour and an outer contour, the inner contour corresponds to L grid vertexes, the outer contour corresponds to P grid vertexes, and the sum of L and P is less than N, wherein the contour information of the target part comprises a first distance between the inner contour and the outer contour and a second distance between every two grid vertexes in the P grid vertexes corresponding to the outer contour, and wherein the first distance comprises a distance between the L grid vertexes and grid vertexes having a correspondence relationship from among the P grid vertexes.

10. An image processing apparatus, comprising:

at least one non-transitory memory configured to store program code; and at least one processor configured to read the program code and operate as instructed by the program code, the program code comprising:

first acquisition code configured to cause the at least one processor to acquire an image-to-be-processed, the image-to-be-processed comprising a target part of an object, morphology of the target part being a first morphology, and the first morphology being not matched with an expected morphology;

second acquisition code configured to cause the at least one processor to acquire description information corresponding to the first morphology and acquire contour information about the target part in the first morphology;

splicing code configured to cause the at least one processor to acquire a dimension reduction matrix and performing dimension reduction processing on the description information through the dimension reduction matrix, and to splice the description information and the contour information after the dimension reduction processing;

first calling code configured to cause the at least one processor to call a parameter prediction model for parameter prediction based on the splicing processing result to obtain a target parameter of the morphology controller; and correction code configured to cause the at least one processor to correct the morphology of the target part based on the target parameter in order to correct the morphology of the target part from the first morphology to a second morphology, the second morphology being matched with the expected morphology, wherein the parameter prediction model is trained based on first prediction description information about the target part in a training morphology that matches with an expected training morphology, the first prediction description information being generated based on training parameters of a morphology controller generated by the parameter prediction model.

11. The apparatus according to claim 10, wherein the target part is bound to the morphology controller, and wherein the correction code comprises:

second calling code configured to cause the at least one processor to call the morphology controller to adjust the description information based on the target parameter, the adjusted description information being used to enable the morphology of the target part to be presented as the second morphology.

12. The apparatus according to claim 11, wherein the program code further comprises:

second acquisition code configured to cause the at least one processor to acquire the first training sample, wherein the first training sample comprises a first sample image and label information corresponding to the first sample image, wherein the first sample image comprises the target part of the object, wherein the label information comprises corresponding first description information about the target part in the first sample image in first training morphology and corresponding second description information about the target part in the first sample image in second training morphology, wherein the first training morphology is not matched with the expected training morphology, and the second training morphology is matched with the expected training morphology;

third acquisition code configured to cause the at least one processor to acquire training contour information about the target part in the first sample image in the first training morphology, and splicing the training contour information and the first description information; and prediction code configured to cause the at least one processor to train the parameter prediction model according to the first prediction description information and the second description information.

13. The apparatus according to claim 12, wherein the program code further comprises:

fourth acquisition code configured to cause the at least one processor to acquire a second training sample, the second training sample comprising a second sample image and a correspondence relationship between third description information and a second training parameter of the morphology controller, the second sample image comprising the target part of the object, and the third description information referring to the corresponding description information about the target part in the second sample image in a third training morphology;

fourth calling code configured to cause the at least one processor to call the location prediction model based on the second training parameter to obtain second prediction description information; and training code configured to cause the at least one processor to train the location prediction model based on the second prediction description information and the third description information.

14. The apparatus according to claim 12, wherein the training code is further configured to cause the at least one processor to:

determine a first loss function corresponding to the parameter prediction model based on the first prediction description information and the second description information; and update network parameters in the parameter prediction model based on the first loss function by a back propagation algorithm.

15. The apparatus according to claim 12, wherein the third acquisition code is further configured to cause the at least one processor to:

acquire the dimension reduction matrix and performing dimension reduction processing on the first description information through the dimension reduction matrix; and splice the first description information and the training contour information after the dimension reduction processing.

16. The apparatus according to claim 10, wherein the image-to-be-processed is associated with an image grid, the image grid comprises M grid vertexes, and the target part corresponds to N grid vertexes in the M grid vertexes, where M and N are integers larger than 1, and N is less than or equal to M, and wherein the description information corresponding to the first morphology comprises location information of the N grid vertexes.

17. The apparatus according to claim 16, wherein the target part comprises an inner contour and an outer contour, the inner contour corresponds to L grid vertexes, the outer contour corresponds to P grid vertexes, and the sum of L and P is less than N, wherein the contour information of the target part comprises a first distance between the inner contour and the outer contour and a second distance between every two grid vertexes in the P grid vertexes corresponding to the outer contour, and wherein the first distance comprises a distance between the L grid vertexes and grid vertexes having a correspondence relationship from among the P grid vertexes.

18. A non-transitory computer-readable medium containing program code that when executed by at least one processor of an image processing device, causes the at least one processor to:

acquire an image-to-be-processed, the image-to-be-processed comprising a target part of an object, a morphology of the target part being a first morphology, and the first morphology being not matched with an expected morphology;

acquire description information corresponding to the first morphology and acquire contour information about the target part in the first morphology;

acquire a dimension reduction matrix and performing dimension reduction processing on the description information through the dimension reduction matrix, and splice the description information and the contour information after the dimension reduction processing;

call a parameter prediction model for parameter prediction based on the splicing processing result to obtain a target parameter; and correct the morphology of the target part based on the target parameter in order to correct the morphology of the target part from the first morphology to a second morphology, the second morphology being matched with the expected morphology, wherein the parameter prediction model is trained based on first prediction description information about the target part in a training morphology that matches with an expected training morphology, the first prediction description information being generated based on training parameters of a morphology controller generated by the parameter prediction model.

* * * * *